US012683663B2

(12) United States Patent
Suh et al.

(10) Patent No.: US 12,683,663 B2
(45) Date of Patent: Jul. 14, 2026

(54) WIRELESS SYSTEM, APPARATUS, AND METHOD FOR QUANTIZATION OF CHANNEL STATE INFORMATION UTILIZING REAL AND IMAGINARY PARTS OF A CHANNEL MATRIX

(71) Applicant: Huawei Technologies Co., Ltd., Shenzhen (CN)

(72) Inventors: Jung Hoon Suh, Kanata (CA); Yan Xin, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 284 days.

(21) Appl. No.: 18/630,733

(22) Filed: Apr. 9, 2024

(65) Prior Publication Data

US 2024/0259068 A1     Aug. 1, 2024

Related U.S. Application Data

(63) Continuation of application No. PCT/CN2022/135101, filed on Nov. 29, 2022.

(60) Provisional application No. 63/284,419, filed on Nov. 30, 2021.

(51) Int. Cl.
*H04B 7/00* (2006.01)
*H04B 7/06* (2006.01)

(52) U.S. Cl.
CPC ......... *H04B 7/0626* (2013.01); *H04B 7/0636* (2013.01)

(58) Field of Classification Search
CPC ... H04B 7/0626; H04B 7/0636; H04B 7/0663
See application file for complete search history.

(56) References Cited

U.S. PATENT DOCUMENTS

| | | | | |
|---|---|---|---|---|
| 10,278,141 B2 * | 4/2019 | Yang | ..................... | H04W 72/21 |
| 2003/0036359 A1 * | 2/2003 | Dent | ..................... | H04B 7/005 |
| | | | | 455/63.1 |
| 2014/0348106 A1 * | 11/2014 | Bao | ..................... | H04B 7/0626 |
| | | | | 370/329 |
| 2024/0063852 A1 * | 2/2024 | Kwon | ............... | H04W 72/0446 |
| 2025/0047343 A1 * | 2/2025 | Chitrakar | ............. | H04B 7/0626 |

\* cited by examiner

*Primary Examiner* — Pakee Fang
(74) *Attorney, Agent, or Firm* — Tim Tingkang Xia, Esq.; Troutman Pepper Locke LLP

(57) ABSTRACT

A method for generating channel state information (CSI). The method includes determining the maximum amplitude of the real and imaginary parts of each element of a channel matrix, converting each maximum amplitude to a fixed-point value within a predefined range, determining a bit-shifting number for each maximum amplitude by comparing each fixed-point value with a series of predefined threshold values within the predefined range, quantizing the real and imaginary parts of each element of the channel matrix to an integer, and bit-shifting each of the quantized real and imaginary parts of each element of the channel matrix towards the most significant bit (MSB) by the corresponding bits and truncating the bit-shifted result to a predefined number of bits for generating channel state information (CSI) for use in communication.

20 Claims, 3 Drawing Sheets

240

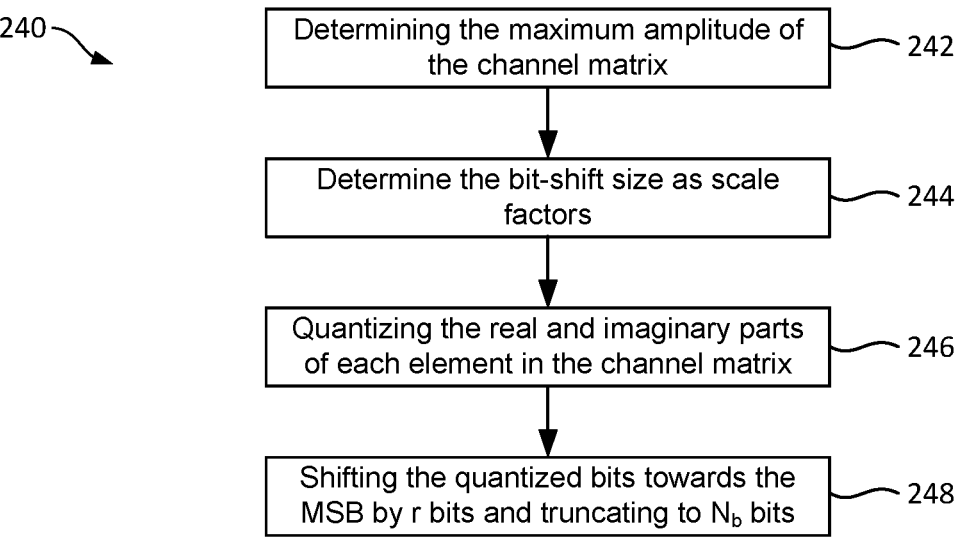

242 — Determining the maximum amplitude of the channel matrix

244 — Determine the bit-shift size as scale factors

246 — Quantizing the real and imaginary parts of each element in the channel matrix 248 — Shifting the quantized bits towards the MSB by r bits and truncating to $N_b$ bits

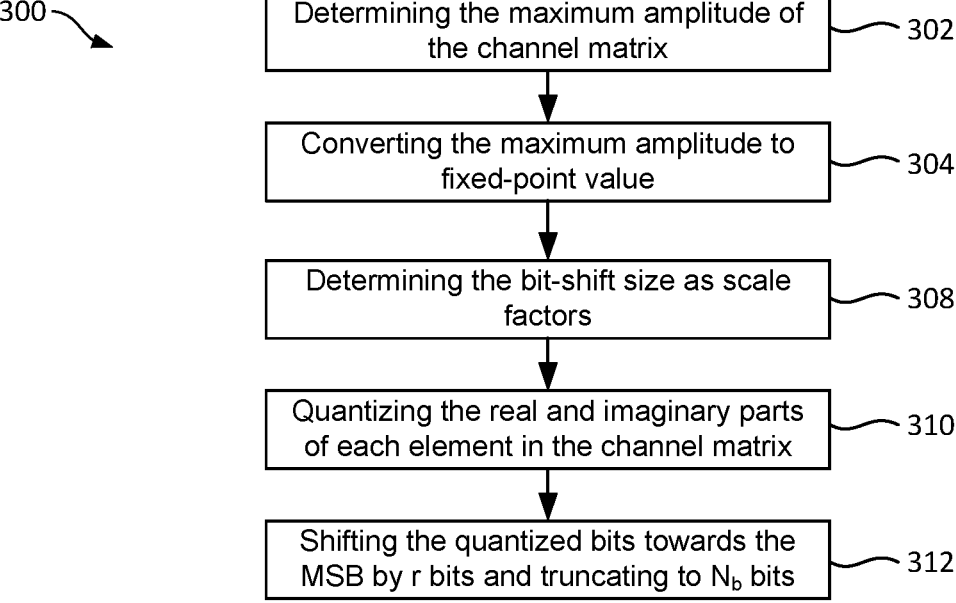

302 — Determining the maximum amplitude of the channel matrix

304 — Converting the maximum amplitude to fixed-point value

308 — Determining the bit-shift size as scale factors

310 — Quantizing the real and imaginary parts of each element in the channel matrix 312 — Shifting the quantized bits towards the MSB by r bits and truncating to $N_b$ bits

FIG. 4

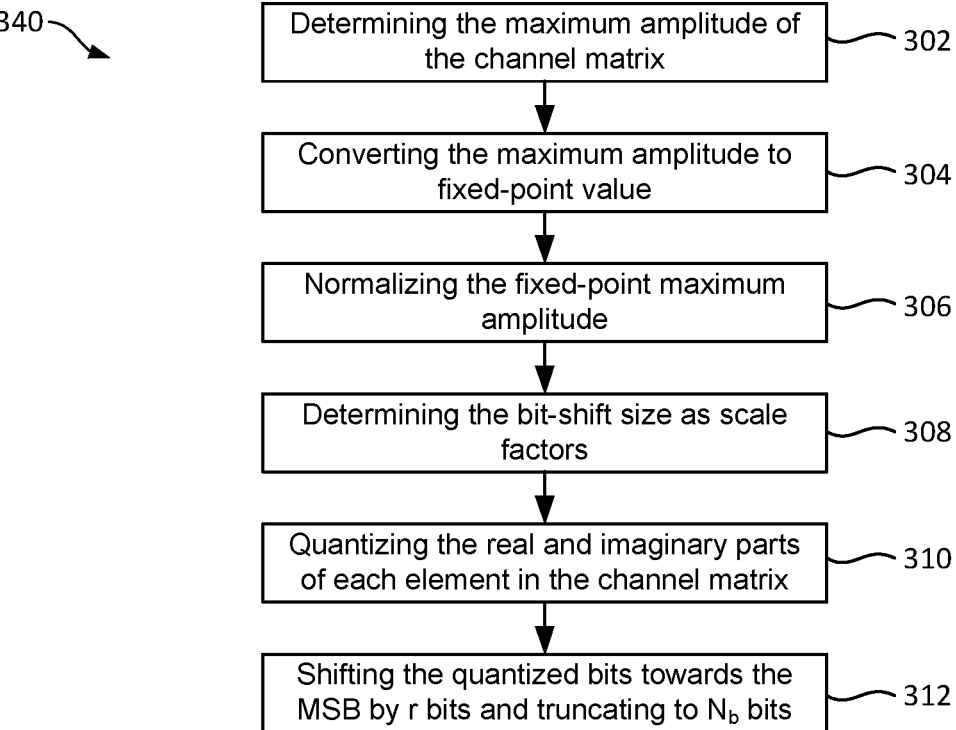

340

Determining the maximum amplitude of the channel matrix — 302

Converting the maximum amplitude to fixed-point value — 304

Normalizing the fixed-point maximum amplitude — 306

Determining the bit-shift size as scale factors — 308

Quantizing the real and imaginary parts of each element in the channel matrix — 310

Shifting the quantized bits towards the MSB by r bits and truncating to $N_b$ bits — 312

FIG. 5

WIRELESS SYSTEM, APPARATUS, AND METHOD FOR QUANTIZATION OF CHANNEL STATE INFORMATION UTILIZING REAL AND IMAGINARY PARTS OF A CHANNEL MATRIX

CROSS-REFERENCE TO RELATED APPLICATIONS

This application is a continuation application of Patent Cooperation Treaty Application No. PCT/CN2022/135101, filed on Nov. 29, 2022, which claims the benefit of U.S. Provisional Patent Application Ser. No. 63/284,419, filed Nov. 30, 2021, the content of each of which is incorporated herein by reference in its entirety.

TECHNICAL FIELD

The present disclosure relates generally to wireless system, apparatus, and method for obtaining channel state information, and in particular to wireless system, apparatus, and method for quantization of channel state information with low complexity scale-factor.

BACKGROUND

Wireless communication systems are known. In recent years, multiple-input-multiple-output (MIMO) and orthogonal frequency division multiplexing (OFDM) have been used in wireless communications such as wireless local area network (WLAN), mobile wireless communication systems, and/or the like. As known in the art, wireless channels are generally time-varying, and wireless signals may experience a variety of distortions such as channel fading, path loss, shadowing, interferences, noise, and/or the like. In today's wireless communication systems, wireless channels are often measured or otherwise estimated to obtain the channel state information (CSI) which may be used for processing the received wireless signal to compensate for the distortion therein for reliable wireless communication. Moreover, the CSI information obtained at one side (for example, obtained at the receiver side) may be fed-back to the other side (for example, the transmitter side) to further improve communication performance.

In CSI feedback, the CSI generally needs to be quantized to a predefined precision (for example, a predefined length of bits) for saving the bandwidth required for CSI transmission. However, quantization of CSI information may introduce additional distortions to the wireless signal.

SUMMARY

According to one aspect of this disclosure, there is provided a method for generating channel state information (CSI), the method comprising: determining a maximum amplitude of the real and imaginary parts of each element of a channel matrix for a channel; converting each maximum amplitude to a fixed-point value within a predefined range; determining a bit-shifting number for each maximum amplitude by comparing each fixed-point value with a series of predefined threshold values within the predefined range; quantizing the real and imaginary parts of each element of the channel matrix to an integer; and bit-shifting each of the quantized real and imaginary parts of each element of the channel matrix towards the most significant bit (MSB) by the corresponding bit-shifting number and truncating the bit-shifted result to a predefined number of bits for generating channel state information (CSI) for use in communication.

In some embodiments, the predefined range is a range between $2^{(N_p-R)}$ and $2^{(N_p-2)}$, where $N_p$ is the number of bits in an internal fixed-point CSI representation and $N_p$ is greater than or equal to the predefined number of bits, and R is a maximum of the bit-shifting number.

In some embodiments, R=7.

In some embodiments, the series of predefined numbers comprise $2^{(N_p-2)}$, $2^{(N_p-3)}$, . . . , $2^{(N_p-R-1)}$.

In some embodiments, said determining the bit-shifting number for each maximum amplitude comprises: determining the bit-shifting number as zero if the maximum amplitude is greater than or equal to $2^{(N_p-2)}$; determining the bit-shifting number as i if the maximum amplitude is greater than or equal to $2^{(N_p-2-i)}$ and smaller than $2^{(N_p-2-i+1)}$, where $1 \leq i \leq R-1$; and determining the bit-shifting number as R if the maximum amplitude is smaller than $2^{(N_p-R-1)}$.

In some embodiments, said quantizing the real and imaginary parts of each element of the channel matrix to the integer comprises: quantizing the real and imaginary parts of each element of the channel matrix by multiplying each of the real and imaginary parts by $(2^{N_p-1}-1)$ and then rounding the multiplication result to the nearest integer.

In some embodiments, the method further comprises: obtaining a channel estimation, the channel estimation comprising the channel matrix.

In some embodiments, the channel comprises a plurality of subcarriers; the channel matrix is for one of the plurality of subcarriers; and the method further comprises: performing said determining the maximum amplitude, said converting each maximum amplitude, said determining the bit-shifting number, said quantizing the real and imaginary parts, and said bit-shifting for the plurality of subcarriers.

According to one aspect of this disclosure, there is provided a wireless apparatus comprising: a processor for performing the above-described method.

According to one aspect of this disclosure, there is provided one or more non-transitory computer-readable storage devices comprising computer-executable instructions, wherein the instructions, when executed, cause a processing structure to perform the above-described method.

Note that the maximum amplitude is a floating-point number. After converting the maximum amplitude to a fixed-point value, the comparisons of the fixed-point value with the series of predefined threshold values have reduced computational costs than prior-art methods. In some embodiments, the fixed-point value is also normalized to within a predefined range, therefore ensuring proper determination of the bit-shifting number.

BRIEF DESCRIPTION OF THE DRAWINGS

FIG. 3 is a flowchart showing a prior-art procedure for CSI quantization;

FIG. 4 is a flowchart showing a procedure for CSI quantization according to some embodiments of this disclosure; and FIG. 5 is a flowchart showing a procedure for CSI quantization according to yet other embodiments of this disclosure.

DETAILED DESCRIPTION

Figure 1:
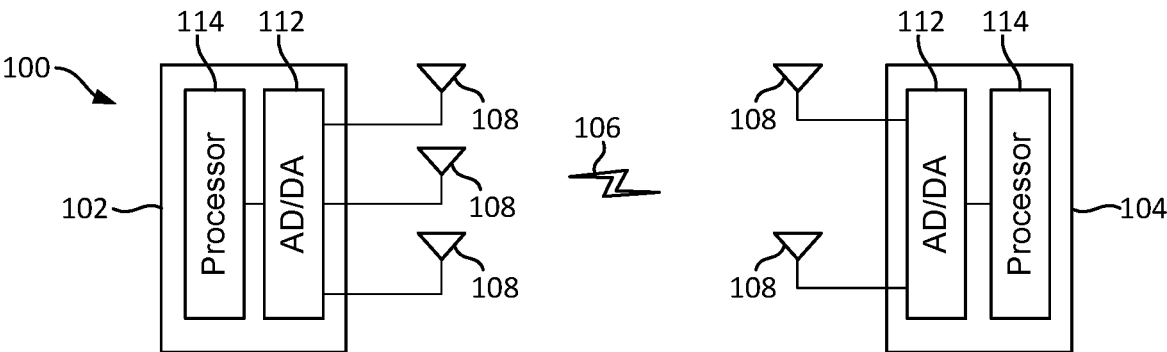
FIG. 1 is a simplified schematic diagram showing a communication system having at least two wireless devices, according to some embodiments of this disclosure.

Turning now the FIG. 1, a communication system according to some embodiments of this disclosure is shown and is generally identified using reference numeral 100. The communication system 100 may be any suitable wireless communication system, for example, a WI-FI® system (WI-FI is a registered trademark of Wi-Fi Alliance, Austin, TX, USA) according to a suitable standard such as IEEE 802.11n, 802.11ac, 802.11bf, and/or the like.

The communication system 100 comprises at least two wireless devices 102 and 104 in wireless communication therebetween via an air interface 106. In these embodiments, the wireless devices 102 and 104 may be any suitable devices with wireless communication functions such as wireless network devices (for example wireless routers, wireless access points (APs), radio access network (RAN) devices, and/or the like) and/or wireless user devices (for example, laptop computers, desk computers, smartphones, smart TVs, wireless cameras, wireless sensors, and/or the like), and in many use cases, one of the wireless devices 102 and 104 (such as the wireless device 102) may be a wireless network device and the other one of the wireless devices 102 and 104 (such as the wireless device 104) may be a wireless user device.

Each of the wireless devices 102 and 104 comprises one or more antennas 108, an analog-to-digital and digital-to-analog (AD/DA) converter 112 coupled to the antennas 108, and a processor or processing circuitry 114 coupled to the AD/DA converter 112. When transmitting signals, for example, from the wireless device 102 to the wireless device 104, the AD/DA converter 112 of the wireless device 102 converts the digital symbols received from the processor 114 to analog signals and sends the analog signals to the antennas 108 for transmission. When, for example, receiving signals transmitted from the wireless device 102 at the wireless device 104, the AD/DA converter 112 of the wireless device 104 converts the analog signals detected by the antennas 108 thereof to digital symbols and sends the digital symbols to the processor 114 thereof for processing.

When at least one of the two wireless devices 102 comprises a plurality of antennas, the system 100 may be considered a multiple-input multiple-output (MIMO) system. Moreover, in these embodiments, the two wireless devices 102 use orthogonal frequency division multiplexing (OFDM) having a plurality of orthogonal subcarriers for wireless communication therebetween, although the two wireless devices 102 may use any suitable wireless communication technologies.

For ease of description, the wireless devices 102 and 104 are denoted hereinafter the transmitter device and the receiver device, respectively.

As is known in the art, the air interface 108 (or the wireless channel) is generally time-varying, and wireless signals transmitted between the two wireless devices 102 and 104 may experience a variety of distortions such as channel fading, path loss, shadowing, interferences, noise, and/or the like. Generally, the relationship between the transmitted signal x(t) and the received signal y(t) may be expressed as:

$$y(t) = x(t) * h(t) + n(t), \tag{1}$$

where "*" represents convolution and n(t) is the noise.

In a transform domain such as the frequency domain, $$Y = XH + N, \tag{2}$$

where Y, X, N are the received signal vector, the transmitted signal vector, and the noise vector in the transform domain, and H is the channel matrix of the air interface 106. The channel state information (CSI) generally comprises the information of the channel matrix H.

The channel matrix H may be measured by, for example, sending from the transmitter device 102 to the receiver device 104 a signal having a plurality of long training field (LTF) symbols on at least a subset of the subcarriers wherein the LTF symbols are known to the receiver device 104. After receiving the signal, the receiver device 104 measures the LTF symbols in the received signal and then estimates the channel matrix H using Equation (2). The estimated channel matrix H is then used in subsequent communication for recovering signal X from the received signal Y.

The estimated channel matrix H or CSI may be fed-back from the receiver device 104 to the transmitter device 102 for various purposes such as for beam forming and/or for further improving the communication performance. For example, after receiving the channel matrix from the receiver device 104, the transmitter device 102 may use the received channel matrix to compute a set of transmit steering matrices.

As is known in the art, the estimated channel matrix H is usually quantized to a certain precision before sending back to the transmitter device 102 for the purpose of reducing the amount of data to be sent to the transmitter device 102. Those skilled in the art will appreciate that different quantization methods may have different computational complexities and may lead to different quantization precisions which in turn affect the communication performance of the wireless communication system 100.

Figure 2:
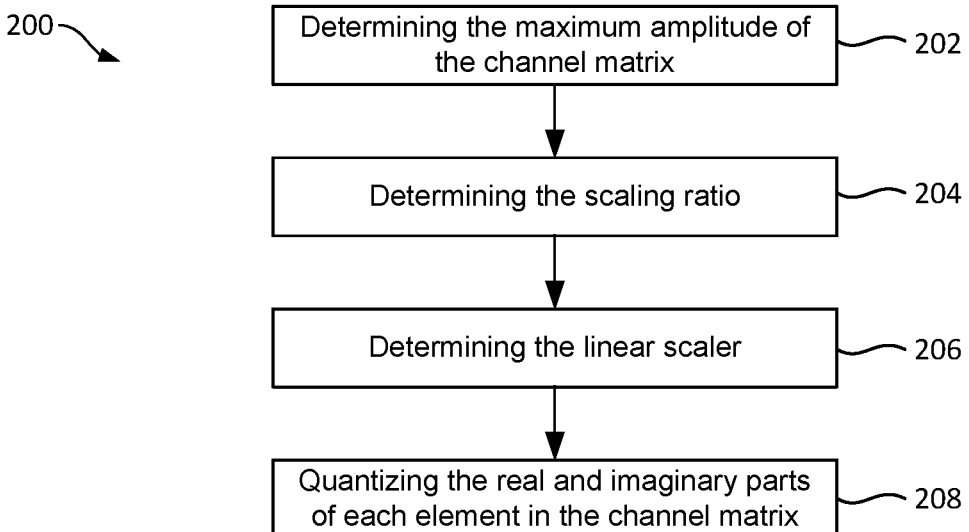
FIG. 2 is a flowchart showing a prior-art procedure for full-channel channel state information (CSI) quantization defined in IEEE 802.11n.

For example, FIG. 2 shows a full-channel CSI quantization procedure 200 defined in IEEE 802.11n (see Reference R1). At step 202, the maximum amplitude of the real and imaginary parts of each element of the channel matrix in each subcarrier is found as following:

$$m_H(k) = \max\left\{ \max\left\{ |\mathrm{Re}(H_{\mathit{eff}(m,l)}(k))| \begin{array}{ll} m = N_r, & l = N_c \\ m = 1, & l = 1 \end{array} \right\}, \right. \tag{3}$$
$$\left. \max\left\{ |\mathrm{Im}(H_{\mathit{eff}(m,l)}(k))| \begin{array}{ll} m = N_r, & l = N_c \\ m = 1, & l = 1 \end{array} \right\} \right\}$$

where max{x} represents the maximum of x, Re(x) represents the real part of x, Im(x) represents the imaginary part of x, |x| represents the absolute value of x, $H_{\mathit{eff}(m,l)}(k)$ is the channel matrix of the k-th subcarrier and $k = -N_{SR}, \ldots, N_{SR}$ with $N_{SR}$ representing the half the size of subcarriers per symbol excluding Nulls, $N_r$ and $N_c$ are the numbers of rows and columns of $H_{\mathit{eff}(m,l)}(k)$, respectively, with $N_r \leq N_{tx}$ and $N_c \leq N_{rx}$, where $N_{tx}$ and $N_{rx}$ are the numbers of the transmitter and receiver antennas, respectively.

At step 204, the scaling ratio is calculated and quantized to three (3) bits as following:

$$M_H(k) = \min\left\{7, \left\lfloor 20\log_{10}\left(\frac{\max\{m_H(z)\}\begin{smallmatrix}z = N_{SR}\\z = -N_{SR}\end{smallmatrix}}{m_H(k)}\right)\right\rfloor\right\} \tag{4}$$

where $\lfloor x \rfloor$ is the largest integer smaller than or equal to x.

At step 206, the linear scaler is given as following:

$$M_H^{lin}(k) = \frac{\max\{m_H(z)\}\begin{smallmatrix}z = N_{SR}\\z = -N_{SR}\end{smallmatrix}}{10^{M_H(k)/20}} \tag{5}$$

At step 208, the real and imaginary parts of each element in the matrix $H_{eff(m,l)}(k)$ are quantized to $N_b$ bits (for example, three bits) in two's complement encoding as defined by following:

$$H_{eff(m,l)}^{q(R)}(k) = \text{Round}\left(\frac{\text{Re}\{H_{eff(m,l)}(k)\}}{M_H^{lin}(k)}\left(2^{N_b-1}-1\right)\right) \tag{6}$$

$$H_{eff(m,l)}^{q(I)}(k) = \text{Round}\left(\frac{\text{Im}\{H_{eff(m,l)}(k)\}}{M_H^{lin}(k)}\left(2^{N_b-1}-1\right)\right)$$

where k is the subcarrier index, and Round (x) gives the integer nearest to x.

The quantized real and imaginary parts $$H_{eff(m,l)}^{q(R)}(k)$$

and $$H_{eff(m,l)}^{q(I)}(k)$$

of the elements in the matrix $H_{eff(m,l)}(k)$ and the corresponding linear scaler $$M_H^{lin}(k)$$

are transmitted to the transmitter device 102. The transmitter device 102 then uses the linear scaler $$M_H^{lin}(k)$$

to rescale (that is, reversely scale) the quantized real and imaginary parts $$H_{eff(m,l)}^{q(R)}(k)$$

and $$H_{eff(m,l)}^{q(I)}(k)$$

and obtains the rescaled CSI matrix.

The CSI quantization procedure 200 involves floating-point calculation which leads to relatively high computational burden.

FIG. 3 shows a CSI quantization procedure 240 described in References R2 and R3.

Step 242 is the same as step 202 of the procedure 200 shown in FIG. 2, wherein the maximum amplitude of the real and imaginary parts of each element of the channel matrix in each subcarrier is found as following:

$$m_H(k) = \max\left\{\max\left\{|\text{Re}(H_{eff(m,l)}(k))|\begin{smallmatrix}m = N_r, & l = N_c\\m = 1, & l = 1\end{smallmatrix}\right\}, \right. \tag{7}$$
$$\left.\max\left\{|\text{Im}(H_{eff(m,l)}(k))|\begin{smallmatrix}m = N_r, & l = N_c\\m = 1, & l = 1\end{smallmatrix}\right\}\right\}$$

At step 244, the bit-shifting size or bit-shifting number r for the k-th subcarrier is calculated as follows:

$$\text{If } m_H(k) \geq 2^{(N_p-2)}$$
$$r = 0$$
$$Elseif \ m_H(k) \geq 2^{(N_p-3)}$$
$$r = 1$$
$$Elseif \ m_H(k) \geq 2^{(N_p-4)}$$
$$r = 2$$
$$\vdots$$
$$Elseif \ m_H(k) \geq 2^{(N_p-8)}$$
$$r = 6$$
$$\text{Else}$$
$$r = 7,$$

where $N_p$ is the number of bits in the internal fixed-point CSI representation (determined by the bit size of the calculation component (for example, the processor 114) of the receiver device 104) and $N_p \geq N_b$. The calculated bit-shifting sizes r are used as the scaling factors.

At step 246, the real and imaginary parts of each element in the matrix $H_{eff(m,l)}(k)$ are quantized with $N_p$ bits in two's complement encoding as defined by following, $$H_{eff(m,l)}^{q(R)}(k) = \text{Round}\left(\text{Re}\{H_{eff(m,l)}(k)\}\left(2^{N_p-1}-1\right)\right) \tag{8}$$

$$H_{eff(m,l)}^{q(I)}(k) = \text{Round}\left(\text{Im}\{H_{eff(m,l)}(k)\}\left(2^{N_p-1}-1\right)\right) \tag{9}$$

At step 248, the quantized real and imaginary parts $$H_{eff(m,l)}^{q(R)}(k)$$

and $$H_{eff(m,l)}^{q(I)}(k)$$

of the elements in the matrix $H_{eff(m,l)}(k)$ are bit-shifted towards the most significant bit (MSB) by r bits, and then the quantized and bit-shifted real and imaginary parts $$H_{eff(m,l)}^{q(R)}(k)$$

and $$H_{eff(m,l)}^{q(I)}(k)$$

are truncated to $N_b$ bits by truncating the least significant bits (LSBs) by $(N_p-N_b)$ bits which turns into $N_b$ bits of quantized CSI for feedback.

The quantized and bit-shifted real and imaginary parts $$H_{eff(m,l)}^{q(R)}(k)$$

and $$H_{eff(m,l)}^{q(I)}(k)$$

and the corresponding bit-shifting size r are transmitted to the transmitter device 102. The transmitter device 102 then pads ones by r bits ahead of the MSB of the quantized and bit-shifted real and imaginary parts $$H_{eff(m,l)}^{q(R)}(k)$$

and $$H_{eff(m,l)}^{q(I)}(k)$$

and obtains the rescaled CSI matrix, followed by zero padding or truncation in LSBs, depending on the difference between $N_p$ of the receiver device 104 and the $N_p$ of the transmitter device 102.

FIG. 4 shows a CSI quantization procedure according to some embodiments of this disclosure.

Step 302 is the same as step 202 of the procedure 200 shown in FIG. 2, wherein the maximum amplitude of the real and imaginary parts of each element of the channel matrix in each subcarrier is found as following:

$$m_H(k) = \max\left\{\max\left\{|\mathrm{Re}(H_{eff(m,l)}(k))|\begin{matrix} m=N_r, & l=N_c \\ m=1, & l=1 \end{matrix}\right\},\right. \tag{10}$$
$$\left.\max\left\{|\mathrm{Im}(H_{eff(m,l)}(k))|\begin{matrix} m=N_r, & l=N_c \\ m=1, & l=1 \end{matrix}\right\}\right\}$$

At step 304, the maximum amplitude $m_H(k)$ is converted to a fixed-point value, for example:

$$M_H^{fix}(k) = \mathrm{Round}\left(m_H(k) * \left(2^{N_p-1}-1\right)\right) \tag{11}$$

At step 308, the bit-shifting size or bit-shifting number r(k) for the k-th subcarrier is calculated as follows:

$$\text{If } M_H^{fix}(k) \geq 2^{(N_p-2)}$$
$$r(k) = 0$$
$$Elself\ M_H^{fix}(k) \geq 2^{(N_p-3)}$$
$$r(k) = 1$$
$$Elself\ M_H^{fix}(k) \geq 2^{(N_p-4)}$$
$$r(k) = 2$$
$$\vdots$$
$$Elself\ M_H^{fix}(k) \geq 2^{(N_p-R-1)}$$
$$r(k) = R - 1$$
$$\text{Else}$$
$$r(k) = R,$$

where $N_p$ is the number of bits in the internal CSI representation (determined by the bit size of the calculation component (for example, the processor 114) of the receiver device 104), $R=2^{M_{r(k)}}-1$ is the maximum of r(k), and $M_{r(k)}$ represents the bit size of R (that is, $M_{r(k)}\geq 1$ is an integer; for example, R=7 for three-bit r(k)). In other words, $$\text{if } M_H^{fix}(k) \geq 2^{(N_p-2)}, \text{ then } r(k) = 0;$$
$$\text{if } 2^{(N_p-2-i+1)} > M_H^{fix}(k) \geq 2^{(N_p-2-i)}, \text{ then } r(k) = i, \text{ where } 1 \leq i \leq R-1; \text{ and}$$
$$\text{if } M_H^{fix}(k) < 2^{(N_p-R-1)}, r(k) = R.$$

This step generally checks the bit size of the maximum amplitude $m_H(k)$ in each subcarrier and determines the bit-shifting number r(k) for the k-th subcarrier. The calculated bit-shifting numbers r(k) are used as the scaling factors.

At step 310, the real and imaginary parts of each element in the matrix $H_{eff(m,l)}(k)$ are quantized with $N_p$ bits in two's complement encoding as defined by following, $$H_{eff(m,l)}^{q(R)}(k) = \mathrm{Round}\left(\mathrm{Re}\{H_{eff(m,l)}(k)\}\left(2^{N_p-1}-1\right)\right) \tag{12}$$
$$H_{eff(m,l)}^{q(I)}(k) = \mathrm{Round}\left(\mathrm{Im}\{H_{eff(m,l)}(k)\}\left(2^{N_p-1}-1\right)\right) \tag{13}$$

At step 312, the quantized real and imaginary parts $$H_{eff(m,l)}^{q(R)}(k)$$

and $$H_{eff(m,l)}^{q(I)}(k)$$

of the elements in the matrix $H_{eff(m,l)}(k)$ are bit-shifted towards the MSB by r(k) bits, and then the quantized and bit-shifted real and imaginary parts $$H^{q(R)}_{eff(m,l)}(k)$$

and $$H^{q(I)}_{eff(m,l)}(k)$$

are truncated to $N_b$ bits by truncating the LSBs by $(N_p-N_b)$ bits which turns into $N_b$ bits of quantized CSI for feedback.

The quantized and bit-shifted real and imaginary parts $$H^{q(R)}_{eff(m,l)}(k)$$

and $$H^{q(I)}_{eff(m,l)}(k)$$

and the corresponding bit-shifting number r(k) are transmitted to the transmitter device 102. The transmitter device 102 then pads ones by r(k) bits ahead of the MSB of the quantized and bit-shifted real and imaginary parts $$H^{q(R)}_{eff(m,l)}(k)$$

and $$H^{q(I)}_{eff(m,l)}(k)$$

and obtains the rescaled CSI matrix, followed by zero padding or truncation in LSBs, depending on the difference between $N_p$ of the receiver device 104 and the $N_p$ of the transmitter device 102.

Note that the maximum amplitude $m_H(k)$ is a floating-point number. After converting $m_H(k)$ to a fixed-point value $$M^{fix}_H(k)$$

at step 304, the comparisons in step 308 have much lower computational costs than step 244 of the procedure 240 which involves a plurality of comparisons between a floating-point number $m_H(k)$ and a plurality of fixed-point numbers $2^{(N_p-2)}, 2^{(N_p-3)}, \ldots, 2^{(N_p-R)}$.

FIG. 5 shows a CSI quantization procedure 340 according to some embodiments of this disclosure. The CSI quantization procedure 340 is similar to the CSI quantization procedure 300 shown in FIG. 4 except that the CSI quantization procedure 340 in these embodiments comprises a step 306 between steps 304 and 308.

At step 306, the fixed-point maximum amplitudes $$M^{fix}_H(k), k = -N_{SR}, \ldots, N_{SR},$$

are normalized to a range between $2^{(N_p-R)}$ and $2^{(N_p-2)}$ (or $m_H(k)$ in a range between $$\frac{2^{(N_p-R)}}{2^{(N_p-1)}} \text{ and } \frac{2^{(N_p-2)}}{2^{(N_p-1)}})$$

for properly determining the bit-shifting number r(k) at step 308.

After step 312, the quantized and bit-shifted real and imaginary parts $$H^{q(R)}_{eff(m,l)}(k)$$

and $$H^{q(I)}_{eff(m,l)}(k)$$

and the corresponding bit-shifting number r(k) are transmitted to the transmitter device 102. The transmitter device 102 then pads ones by r(k) bits ahead of the MSB of the quantized and bit-shifted real and imaginary parts $$H^{q(R)}_{eff(m,l)}(k)$$

and $$H^{q(I)}_{eff(m,l)}(k)$$

and obtains the rescaled CSI matrix, followed by zero padding or truncation in LSBs, depending on the difference between $N_p$ of the receiver device 104 and the $N_p$ of the transmitter device 102.

In some embodiments, the wireless devices 102 and 104 may not comprise an AD/DA converter 112. Rather, it may comprise separated AD converter and DA converter.

REFERENCES (R1) IEEE 802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications; https://standards.ieee.org/standard/802_11-2012.html (R2) S. Shellhammer, et al., "Low-Complexity Scaling and Quantization for CSI Report", TGbf, 21/1573r1

(R3) S. Shellhammer, et al., "Calculation of the Scaling Factor in the Sensing CSI Report", TGbf, 21/1705r0

Although embodiments have been described above with reference to the accompanying drawings, those of skill in the art will appreciate that variations and modifications may be made without departing from the scope thereof as defined by the appended claims.

What is claimed is:

1. A method comprising the steps of:

determining a maximum amplitude of real and imaginary parts of each element of a channel matrix for a channel;

converting each maximum amplitude to a fixed-point value within a predefined range;

determining a bit-shifting number for each maximum amplitude by comparing each fixed-point value with a series of predefined threshold values within the predefined range;

quantizing the real and imaginary parts of each element of the channel matrix to an integer; and bit-shifting each of the quantized real and imaginary parts of each element of the channel matrix towards the most significant bit (MSB) by the corresponding bit-shifting number and truncating the bit-shifted result to a predefined number of bits for generating channel state information (CSI) for use in communication.

2. The method of claim 1, wherein the predefined range is a range between $2^{(N_p-R)}$ and $2^{(N_p-2)}$, where $N_p$ is the number of bits in an internal fixed-point CSI representation and $N_p$ is greater than or equal to the predefined number of bits, and R is a maximum of the bit-shifting number.

3. The method of claim 2, wherein R=7.

4. The method of claim 2, wherein the series of predefined threshold values comprise $2^{(N_p-2)}$, $2^{(N_p-3)}$, . . . , $2^{(N_p-R-1)}$.

5. The method of claim 2, wherein said determining the bit-shifting number for each maximum amplitude comprises:

determining the bit-shifting number as zero if the maximum amplitude is greater than or equal to $2^{(N_p-2)}$;

determining the bit-shifting number as i if the maximum amplitude is greater than or equal to $2^{(N_p-2-i)}$ and smaller than $2^{(N_p-2-i+1)}$, where $1 \le i \le R-1$; and determining the bit-shifting number as R if the maximum amplitude is smaller than $2^{(N_p-R-1)}$.

6. The method of claim 5, wherein said quantizing the real and imaginary parts of each element of the channel matrix to the integer comprises:

quantizing the real and imaginary parts of each element of the channel by multiplying each of the real and imaginary parts by $(2^{N_p-1}-1)$ and then rounding the multiplication result to the nearest integer.

7. The method of claim 1, wherein the channel comprises a plurality of subcarriers;

wherein the channel matrix is for one of the plurality of subcarriers; and wherein the method further comprises:

performing said determining the maximum amplitude, said converting each maximum amplitude, said determining the bit-shifting number, said quantizing the real and imaginary parts, and said bit-shifting for the plurality of subcarriers.

8. A wireless apparatus comprising:

a processor for:

determining a maximum amplitude of real and imaginary parts of each element of a channel matrix for a channel;

converting each maximum amplitude to a fixed-point value within a predefined range;

determining a bit-shifting number for each maximum amplitude by comparing each fixed-point value with a series of predefined threshold values within the predefined range;

quantizing the real and imaginary parts of each element of the channel matrix to an integer; and bit-shifting each of the quantized real and imaginary parts of each element of the channel matrix towards the most significant bit (MSB) by the corresponding bit-shifting number and truncating the bit-shifted result to a predefined number of bits for generating channel state information (CSI) for use in communication.

9. The wireless apparatus of claim 8, wherein the predefined range is a range between $2^{(N_p-R)}$ and $2^{(N_p-2)}$, where $N_p$ is the number of bits in an internal fixed-point CSI representation and $N_p$ is greater than or equal to the predefined number of bits, and R is a maximum of the bit-shifting number.

10. The wireless apparatus of claim 9, wherein the series of predefined threshold values comprise $2^{(N_p-2)}$, $2^{(N_p-3)}$, . . . , $2^{(N_p-R-1)}$.

11. The wireless apparatus of claim 9, wherein said determining the bit-shifting number for each maximum amplitude comprises:

determining the bit-shifting number as zero if the maximum amplitude is greater than or equal to $2^{(N_p-2)}$;

determining the bit-shifting number as i if the maximum amplitude is greater than or equal to $2^{(N_p-2-i)}$ and smaller than $2^{(N_p-2-i+1)}$, where $1 \le i \le R-1$; and determining the bit-shifting number as R if the maximum amplitude is smaller than $2^{(N_p-R-1)}$.

12. The wireless apparatus of claim 11, wherein said quantizing the real and imaginary parts of each element of the channel matrix to the integer comprises:

quantizing the real and imaginary parts of each element of the channel by multiplying each of the real and imaginary parts by $(2^{N_p-1}-1)$ and then rounding the multiplication result to the nearest integer.

13. The wireless apparatus of claim 8, wherein the channel comprises a plurality of subcarriers;

wherein the channel matrix is for one of the plurality of subcarriers; and wherein the method further comprises:

performing said determining the maximum amplitude, said converting each maximum amplitude, said determining the bit-shifting number, said quantizing the real and imaginary parts, and said bit-shifting for the plurality of subcarriers.

14. One or more non-transitory computer-readable storage devices comprising computer-executable instructions, wherein the instructions, when executed, cause a processing structure to perform actions comprising:

determining a maximum amplitude of real and imaginary parts of each element of a channel matrix for a channel;

converting each maximum amplitude to a fixed-point value within a predefined range;

determining a bit-shifting number for each maximum amplitude by comparing each fixed-point value with a series of predefined threshold values within the predefined range;

quantizing the real and imaginary parts of each element of the channel matrix to an integer; and bit-shifting each of the quantized real and imaginary parts of each element of the channel matrix towards the most significant bit (MSB) by the corresponding bit-shifting number and truncating the bit-shifted result to a predefined number of bits for generating channel state information (CSI) for use in communication.

15. The one or more non-transitory computer-readable storage devices of claim 14, wherein the predefined range is a range between $2^{(N_p-R)}$ and $2^{(N_p-2)}$, where $N_p$ is the number of bits in an internal fixed-point CSI representation and $N_p$ is greater than or equal to the predefined number of bits, and R is a maximum of the bit-shifting number.

16. The one or more non-transitory computer-readable storage devices of claim 15, wherein R=7.

17. The one or more non-transitory computer-readable storage devices of claim 15, wherein the series of predefined threshold values comprise $2^{(N_p-2)}$, $2^{(N_p-3)}$, . . . , $2^{(N_p-R-1)}$.

18. The one or more non-transitory computer-readable storage devices of claim 15, wherein said determining the bit-shifting number for each maximum amplitude comprises:

determining the bit-shifting number as zero if the maximum amplitude is greater than or equal to $2^{(N_p-2)}$;

determining the bit-shifting number as i if the maximum amplitude is greater than or equal to $2^{(N_p-2-i)}$ and smaller than $2^{(N_p-2-i+1)}$, where $1 \leq i \leq R-1$; and determining the bit-shifting number as R if the maximum amplitude is smaller than $2^{(N_p-R-1)}$.

19. The one or more non-transitory computer-readable storage devices of claim 18, wherein said quantizing the real and imaginary parts of each element of the channel matrix to the integer comprises:

quantizing the real and imaginary parts of each element of the channel by multiplying each of the real and imaginary parts by $(2^{N_p-1}-1)$ and then rounding the multiplication result to the nearest integer.

20. The one or more non-transitory computer-readable storage devices of claim 14, wherein the channel comprises a plurality of subcarriers;

wherein the channel matrix is for one of the plurality of subcarriers; and wherein the method further comprises:

performing said determining the maximum amplitude, said converting each maximum amplitude, said determining the bit-shifting number, said quantizing the real and imaginary parts, and said bit-shifting for the plurality of subcarriers.

* * * * *